US010107650B2

(12) United States Patent
Dunn et al.

(10) Patent No.: US 10,107,650 B2
(45) Date of Patent: Oct. 23, 2018

(54) SYSTEMS AND METHODS FOR MEASURING ANGULAR POSITION OF A LASER BEAM EMITTER (71) Applicant: The Boeing Company, Chicago, IL (US)

(72) Inventors: Casey J. Dunn, Seattle, WA (US); Navrit P. Singh, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 136 days.

(21) Appl. No.: 15/183,128

(22) Filed: Jun. 15, 2016

(65) Prior Publication Data

US 2017/0363448 A1 Dec. 21, 2017

(51) Int. Cl.
G01B 11/02 (2006.01)
G01D 5/26 (2006.01)
H01S 3/00 (2006.01)

(52) U.S. Cl.
CPC ........... *G01D 5/266* (2013.01); *H01S 3/0014* (2013.01)

(58) Field of Classification Search
CPC ........ G01D 5/266; G01D 5/262; G01D 5/264; G01D 5/268; G01D 5/285; G01D 5/305; H01S 3/0014; G01B 11/2441; G01B 11/005; G01B 11/26; G01B 9/02049; G01B 9/02056; G03F 7/70775
USPC .................................. 356/498, 508, 510, 511
See application file for complete search history.

(56) References Cited

U.S. PATENT DOCUMENTS

| 3,551,055 A | 12/1970 | Chitayat |
| 5,237,390 A * | 8/1993 | Chaney ................. G01D 18/00 250/231.13 |
| 5,638,177 A | 6/1997 | Chaney et al. |
| 5,975,744 A | 11/1999 | McFadden et al. |
| 6,597,505 B1 | 7/2003 | Chaney et al. |
| 6,934,641 B2 | 8/2005 | Chapman et al. |
| 7,248,374 B2 | 7/2007 | Bridges |
| 7,352,446 B2 | 4/2008 | Bridges et al. |
| 8,537,376 B2 | 9/2013 | Brown et al. |

OTHER PUBLICATIONS

Renishaw brochure entitled "High-precision laser interferometer feedback systems" (2012).

* cited by examiner

*Primary Examiner* — Tarifur Chowdhury
*Assistant Examiner* — Jonathon Cook
(74) *Attorney, Agent, or Firm* — Ostrager Chong Flaherty & Broitman P.C.

(57) ABSTRACT

Systems and methods for measuring the angular position of a laser beam emitter using only distance measurements. What is physically measured is a feature that is affixed to the laser beam emitter and moves with it. Respective distances which are respective functions of the azimuth and zenith angles are measured using respective position encoders. In accordance with some embodiments, the respective distances are measured using linear encoders (optical or magnetic); in accordance with other embodiments, the respective distances are measured using laser interferometer-based encoders.

20 Claims, 11 Drawing Sheets

SYSTEMS AND METHODS FOR MEASURING ANGULAR POSITION OF A LASER BEAM EMITTER

BACKGROUND

The technology disclosed herein generally relates to laser-based instruments used to measure the three-dimensional (3-D) coordinates of a point. More particularly, the technology disclosed herein relates to systems and methods for measuring the angular position of a laser beam being emitted by a laser-based coordinate measurement device (such as a laser tracker). As used herein, the term "laser" means a device that emits light through a process of optical amplification based on the stimulated emission of electromagnetic radiation.

When manufacturing parts, it is common practice to measure the physical characteristics of the part. These measurements can be used to determine whether the manufactured part is within specified tolerances or allowed thresholds for the part. A coordinate measuring machine can be used to measure the physical characteristics of a part. This type of machine may be manually and/or computer controlled. A coordinate measuring machine typically has three mutually orthogonal axes that form a 3-D coordinate system. The measurements may be used to determine the coordinates of various points on a surface of the manufactured part.

A laser tracker is one type of coordinate measuring machine that measures the 3-D coordinates of a target point by emitting a laser beam toward the target point and then detecting light returned from the target point. A typical laser tracker incorporates a gimbaled mechanism that steers the laser beam to the target point. The laser beam may impinge directly on the target point or on a retroreflector or plane mirror target located at the target point. In each case, the laser tracker determines the coordinates of the target point by measuring the distance to the target point and the azimuth and zenith angles of the laser beam relative to the coordinate system of the laser tracker. The distance is typically measured using an absolute distance meter or an interferometer or both. The azimuth and zenith angles are typically measured using respective angular encoders which are attached to the mechanical axes of the laser tracker. The one distance measurement and two angle measurements are usually sufficient to locate the target point in the coordinate system of the laser tracker. If the location of the laser tracker relative to the frame of reference of the manufactured part is known, a coordinate transformation matrix can be used to convert the location of the target point in the frame of reference of the laser tracker to a location of the target point in the frame of reference of the manufactured part.

The optical and electronic components of a typical laser tracker are well known. For example, laser trackers having various optical systems for steering a laser beam and receiving returned light for the purpose of measuring a distance are disclosed in multiple U.S. patents issued to Faro Technologies, Inc., Lake Mary, Fla. Such components, being well known in the art, will not be described in detail herein.

Laser trackers, although quite accurate over short distances, become increasingly less accurate over distance, to the point where error on the order of ±0.005" or greater is often present in the measurement of an object far away (50 feet or greater). In most applications in which laser trackers are used, this is not a problem, as the structures to be measured are relatively small and the assembly tolerances are relatively loose. In aerospace, however, structures are very large and assembly tolerances are very tight. Because the laser trackers used to locate aircraft assemblies in a factory are themselves not accurate over long distances, an aircraft manufacturer may compensate for this error by (a) mandating tighter manufacturing tolerances upstream of assembly, which adds cost, or (b) utilizing very large, expensive tooling and/or gantry machines that constrain the assemblies accurately with respect to features close to the laser tracker that can then be accurately measured. This also adds cost, in addition to taking up a large amount of factory floor space and making the factory difficult to reconfigure as production rates and the product being manufactured change.

Most laser trackers use three measurements to calculate the position of an object in space: a distance measurement taken using a laser interferometer; and two angle measurements taken using respective angular encoders. The distance measured is the distance separating a reference point inside the laser tracker from the target point. The angles measured are the azimuth and zenith angles (sometimes referred to as the "pan and tilt angles"). The angle measurements measure the angular positions of the laser beam emitter relative to the azimuth and zenith (i.e., elevation) axes respectively. The distance measurement may have an accuracy on the order of ±0.5 micrometers/meter. The azimuth and zenith angle measurements are less accurate than the distance measurement and are a significant source of laser tracker measurement error. The angular encoders measure angles with an accuracy on the order of ±15 micrometers+6 micrometers/meter (i.e., per meter of distance to the target object). Combining the distance and angle measurements allows the laser tracker to find a point in 3-D space. The problem with this design is that the 3-D positional measurement error created by the angular measurement error may be substantial over large distances. Even if the laser beam is a tenth of a degree off from the measured angle, significant random 3-D positional error (on the order of 0.005" or greater) is present over a large measurement volume.

In view of the foregoing, any technological advance that improves the accuracy of measurement of the angular position of a laser beam emitter (especially one incorporated in a laser tracker) would be advantageous.

SUMMARY

The subject matter disclosed in detail below is directed to systems and methods for accurately measuring angular position of a laser beam emitter over a large envelope (i.e., a sphere around the laser beam emitter). If the angular position of the emitted laser beam relative to the laser beam emitter is known, then the angular position of the former can be computed from the latter. Some laser trackers include a gimbaled beam-steering mechanism in the form of a tilt unit rotatably coupled to a pan unit, which in turn is rotatably coupled to a stationary base (embodiments of this type will be described in detail below for the purpose of illustration). However, the concept disclosed herein can be applied to measurement of the angular position of any type of laser beam emitter and is not limited to measuring the angular position of only laser beam emitters incorporated in laser trackers.

The systems and methods proposed herein substitute more accurate distance measurements for less accurate angle measurements to triangulate the measured target point position. What is physically measured is a feature that is fixedly coupled to (i.e., affixed to) the laser beam emitter and moves with it. Respective distances which are respective functions of the azimuth and zenith angles are measured using respective position encoders. In accordance with some embodiments, the respective distances are measured using linear encoders (optical or magnetic); in accordance with other embodiments, the respective distances are measured using laser interferometer-based encoders.

With each laser tracker design disclosed herein, all three measurements used to triangulate the target point's position in 3-D space are very accurate (the precise degree of accuracy depends on the position encoders used). This enables the laser tracker to provide excellent 3-D positional accuracy over a very large envelope (e.g., a sphere of 50 feet in radius or larger around the laser tracker).

One aspect of the subject matter disclosed in detail below is a system for measuring angular position of a laser beam emitter, comprising: a base; a pan unit rotatably coupled to the base and rotatable about a first axis; a tilt unit rotatably coupled to the pan unit, rotatable about a second axis perpendicular to the first axis, and comprising an optically transparent aperture; a laser mounted inside the tilt unit such that a laser beam produced by the laser passes through the aperture; a first linear track having a first fixed position; a second linear track having a second fixed position; a position encoder system comprising a first component displaceably coupled to the first linear track, a second component having a fixed position relative to the first linear track, a third component displaceably coupled to the second linear track, and a fourth component having a fixed position relative to the second linear track; a first expandable linkage comprising a first link fixedly coupled to or integrally formed with the pan unit and a second link rotatably coupled to the first component of the position encoder system; and a second expandable linkage comprising a first link fixedly coupled to or integrally formed with the tilt unit and a second link rotatably coupled to the third component of the position encoder system. Each of the first and third components of the position encoder system comprises a respective electrical output. The system further comprises: an analog-to-digital converter electrically coupled to the electrical outputs of the first and third components of the position encoder system; and a digital processor configured to calculate azimuth and zenith angles of the laser beam emitter based upon electrical outputs from the analog-to-digital converter.

In accordance with some embodiments of the system described in the preceding paragraph, the first and third components of the position encoder system comprise respective reader heads, and the second and fourth components of the position encoder system comprise respective series of reference marks spaced at regular intervals along respective lengths of the first and second linear tracks. In alternative embodiments, the position encoder system may comprise magnetic linear encoders.

In accordance with other embodiments, the first and third components of the position encoder system comprise respective reflectors (e.g., plane mirrors or retroreflectors), and the second and fourth components of the position encoder system comprise respective optical detector heads. In one of the other embodiments, the position encoder system further comprises a laser unit fiber optically coupled to the optical detector heads.

Another aspect of the subject matter disclosed in detail below is a system for measuring angular position of a laser beam emitter, comprising: a base; a pan unit rotatably coupled to the base and rotatable about a first axis; a tilt unit rotatably coupled to the pan unit, rotatable about a second axis perpendicular to the first axis, and comprising an optically transparent aperture; a laser mounted inside the tilt unit such that a laser beam produced by the laser passes through the aperture; a linear track having a fixed position; a position encoder comprising a first component displaceably coupled to the linear track and a second component having a fixed position relative to the linear track; and an expandable linkage comprising a first link fixedly coupled to or integrally formed with the pan unit and a second link rotatably coupled to the first component of the position encoder. In one implementation, the second link is slidably coupled to the first link.

In accordance with some embodiments of the system described in the preceding paragraph, the position encoder comprises a linear encoder. In one such embodiment, the first component of the linear encoder comprises a reader head and the second component of the optical linear encoder comprises a series of reference marks spaced at regular intervals along a length of the linear track. The linear encoder may be of the optical or magnetic variety.

In accordance with other embodiments, the position encoder comprises a laser interferometer-based encoder. In one such other embodiment, the first component of the laser interferometer-based encoder comprises a plane mirror (or other reflector) and the second component of the laser interferometer-based encoder comprises an optical detector head. The optical detector head comprises an interferometer and a photodetector. In at least some embodiments, the laser interferometer-based encoder further comprises a laser unit fiber optically coupled to the interferometer and not coupled to the linear track A further aspect of the subject matter disclosed in detail below is a system for measuring angular position of a laser beam emitter, comprising: a base; a pan unit rotatably coupled to the base and rotatable about a first axis; a tilt unit rotatably coupled to the pan unit, rotatable about a second axis perpendicular to the first axis and comprising an optically transparent aperture; a laser mounted inside the tilt unit such that a laser beam produced by the laser passes through the aperture; a linear track having a fixed position; a position encoder comprising a first component displaceably coupled to the linear track and a second component having a fixed position relative to the linear track; and an expandable linkage comprising a first link fixedly coupled to or integrally formed with the tilt unit and a second link rotatably coupled to the first component of the position encoder. The position encoder may comprise either a linear encoder (optical or magnetic) or a laser interferometer-based encoder.

Yet another aspect of the subject matter disclosed in detail below is a method for measuring angular position of a laser beam emitter rotatably coupled to a rotatable pan unit. The method comprises: (a) measuring a distance traveled by a component of a first position encoder along a first linear track during rotation of the pan unit about a first axis, wherein the component of the first position encoder is coupled to the pan unit by a first expandable linkage; (b) computing an azimuth angle of the laser beam emitter based upon the distance measured in step (a); (c) measuring a distance traveled by a component of a second position encoder along a second linear track during rotation of the laser beam emitter about a second axis perpendicular to the first axis, wherein the component of the second position encoder is coupled to the laser beam emitter by a second expandable linkage; and (d) computing a zenith angle of the laser beam emitter based upon the distance measured in step (c).

Other aspects of systems and methods for measuring angular position of a laser beam emitter are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

FIG. 5A shows a pan unit in a first angular position (i.e., the azimuth angle is 0°) and the corresponding position of a reader head, while FIG. 5B shows the pan unit in a second angular position after the pan unit has rotated about the azimuth axis by an angle θ and the corresponding position of the reader head.

Reference will hereinafter be made to the drawings in which similar elements in different drawings bear the same reference numerals.

DETAILED DESCRIPTION

Illustrative embodiments of an avionics flight management recommender system are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
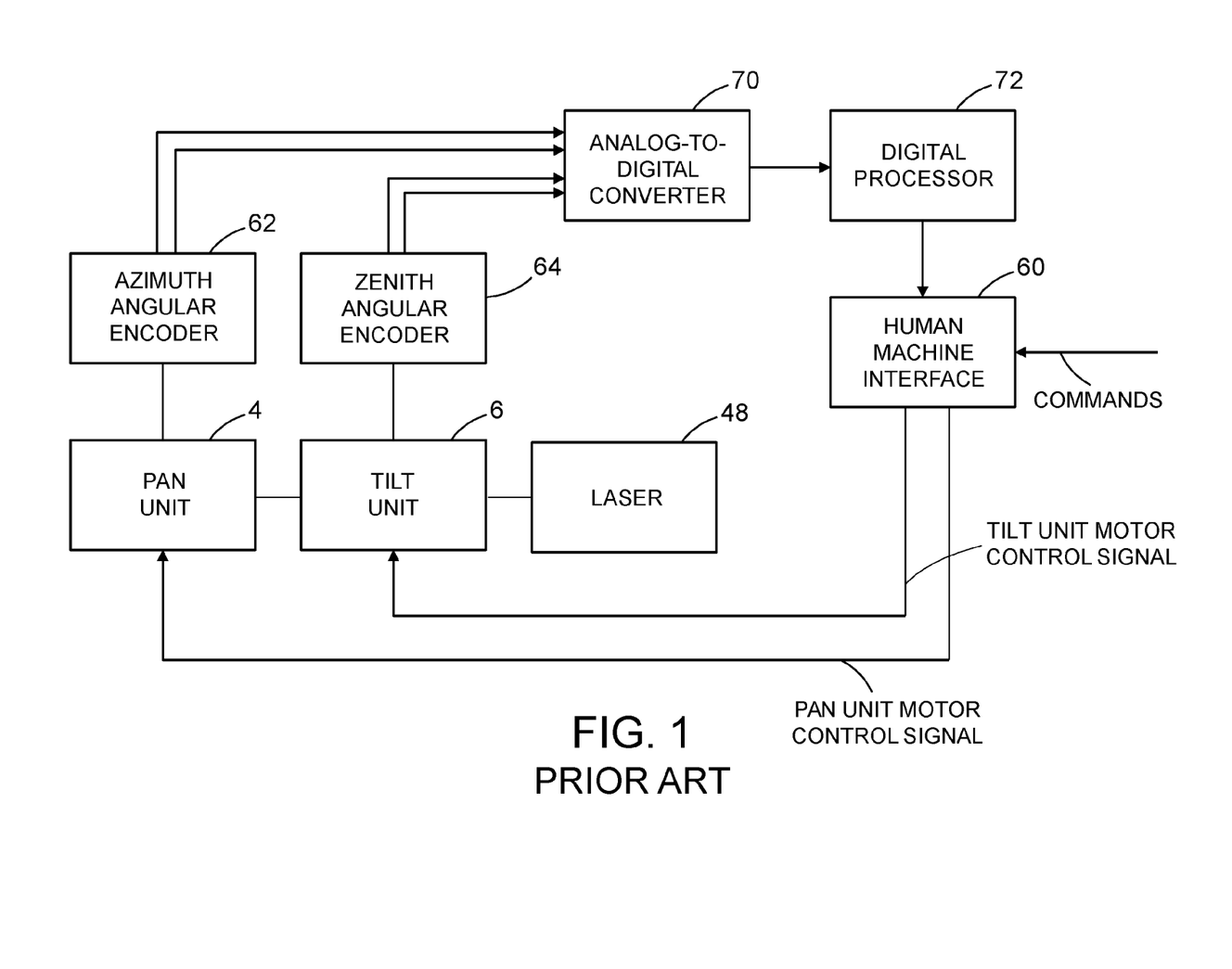
FIG. 1 is a block diagram identifying components of a prior art system for measuring angular position of a laser beam emitter using angular encoders.

FIG. 1 is a block diagram identifying components of a prior art system for measuring angular position of a laser beam emitter using angular encoders. The system components include a pan unit 4 which is rotatably coupled to a base (not shown in FIG. 1), a tilt unit 6 which is rotatably coupled to the pan unit 4, and a laser 48 housed within the tilt unit 6. The laser 48 produces a laser beam which passes through (i.e., is emitted from) an optically transparent aperture (not shown) incorporated in the tilt unit 6. Thus the tilt unit 6 and the laser 48 form a laser beam emitter.

The pan unit 4 is rotatable about an azimuth axis; the tilt unit is rotatable about a zenith axis (which is perpendicular to the azimuth axis). Each of the pan and tilt units 4 and 6 comprises a respective motor (e.g., an electric motor not shown in FIG. 1) for driving rotation of those units in response to the receipt of motor control signals from a human machine interface 60. In the alternative, the motor control signals may be provided by a separate motion controller.

The system depicted in FIG. 1 further comprises an azimuth angular encoder 62 which is coupled to the pan unit 4 for encoding incremental changes in azimuth angular position of the pan unit 4. The system further comprises a zenith angular encoder 64 which is coupled to the tilt unit 6 for encoding incremental changes in zenith angular position of the tilt unit 6. The analog outputs of the azimuth and zenith angular encoders 62 and 64 are sent to an analog-to-digital converter 70. The digital outputs (representing incremental rotations) from the analog-to-digital converter 70 are interpolated and converted into incremental counts by a digital processor 72. The digital processor 72 is configured to compute the current angular position (i.e., azimuth and zenith angles) of the laser beam emitter (i.e., tilt unit 6 and laser 48) based on known starting angular positions and the incremental counts, which represent incremental rotations. This angular position data can be sent to the human machine interface 60 for display on a display screen (not shown). The digital processor 72 may also output pan or tilt unit motor control signals, which can be sent to the pan and tilt unit motors via the human machine interface 60 or directly. When a desired angular position is reached, the motor causing that rotation will be stopped.

As previously discussed, the accuracy of the above-described angular encoders may be insufficient for some purposes. To improve the accuracy of the angle measurements, the systems and methods disclosed herein use a pair of position encoders that measure distance rather than angles. Each position encoder comprises a first component displaceably coupled to a respective linear track and a second component having a fixed position relative to the linear track. The first component of the position encoder travels along a linear track in response to rotation of the laser beam emitter about an axis. The distances that these position encoders travel are a function of respective changes in the azimuth and zenith angles of the rotating laser beam emitter. In accordance with one embodiment described in detail below with reference to FIGS. 2 through 4, the first component of each position encoder comprises a reflector (e.g., a plane mirror or a retroreflector) and the second component comprises an optical detector head that moves along the linear track. In accordance with another embodiment described in detail below with reference to FIGS. 5A and 5B, the first component of each position encoder comprises a reader head that moves along the linear track and the second component comprises a series of reference marks spaced at regular intervals along a length of the linear track.

Figure 2:
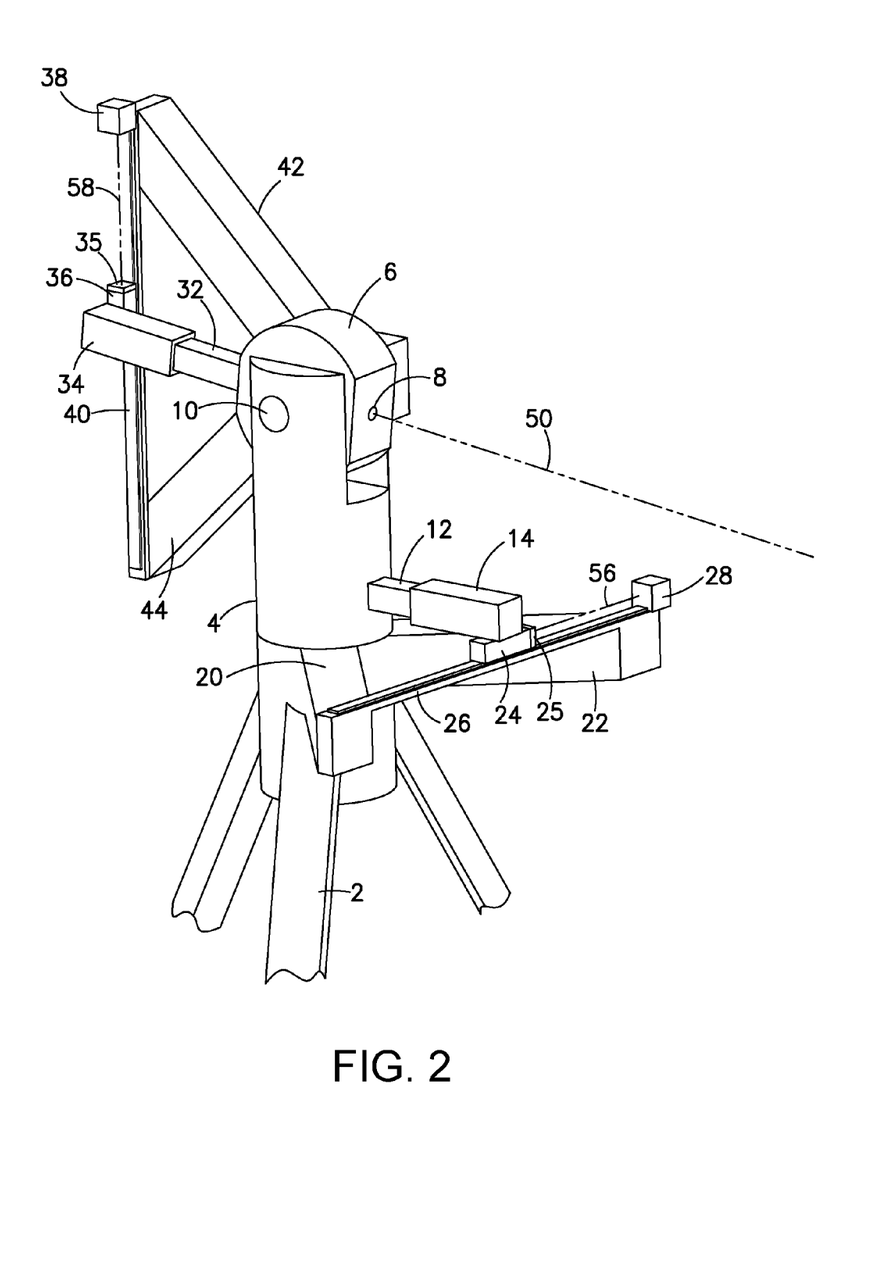
FIG. 2 is a diagram representing an isometric view of some components of a laser tracker having two laser interferometer-based encoders for encoding azimuth and zenith angular positions in accordance with one embodiment.

FIG. 2 is a diagram representing an isometric view of some components of a laser tracker having two laser interferometer-based encoders for encoding azimuth and zenith angular positions in accordance with one embodiment. The laser tracker depicted in FIG. 2 comprises a base 2 in the form of a tripod (alternatively, the base can be a table, tool or other support element), a pan unit 4 which is rotatably coupled to the base 2 for rotation about an azimuth axis, a tilt unit 6 which is rotatably coupled to the pan unit 4 for rotation about a zenith axis, and a laser (not shown in FIG. 2) housed within the tilt unit 6. The laser produces a laser beam 50 which passes through (i.e., is emitted from) an optically transparent aperture 8 incorporated in the housing of the tilt unit 6. Thus the tilt unit 6, laser 48 and aperture 8 effectively form a laser beam emitter that emits a laser beam 50 indicated by a dashed line in FIG. 2. Preferably the angular position of the emitted laser beam 50 relative to the tilt unit 6 is fixed, so that when the angular position of the tilt unit 6 is measured, the angular position of the emitted laser beam can be ascertained. Other components inside the tilt unit 6 include a photodetector and interferometer optical elements for directing incoming light returned from the target object toward the photodetector. Because such elements for detecting returned light are well known and are not germane to the systems disclosed herein for providing enhanced-accuracy measurement of the angular position of a laser beam emitter, those elements for detecting returned light are not described in detail herein.

In accordance with the embodiment depicted in FIG. 2, the laser tracker comprises an axle 10 having opposing ends seated in respective bores formed in upper portions of the pan unit 4. The tilt unit 6 can be rotatably coupled to axle 10 by bearings (not shown). The motors for driving rotation of the pan and tilt units 4 and 6 are not visible in FIG. 2.

Figure 3:
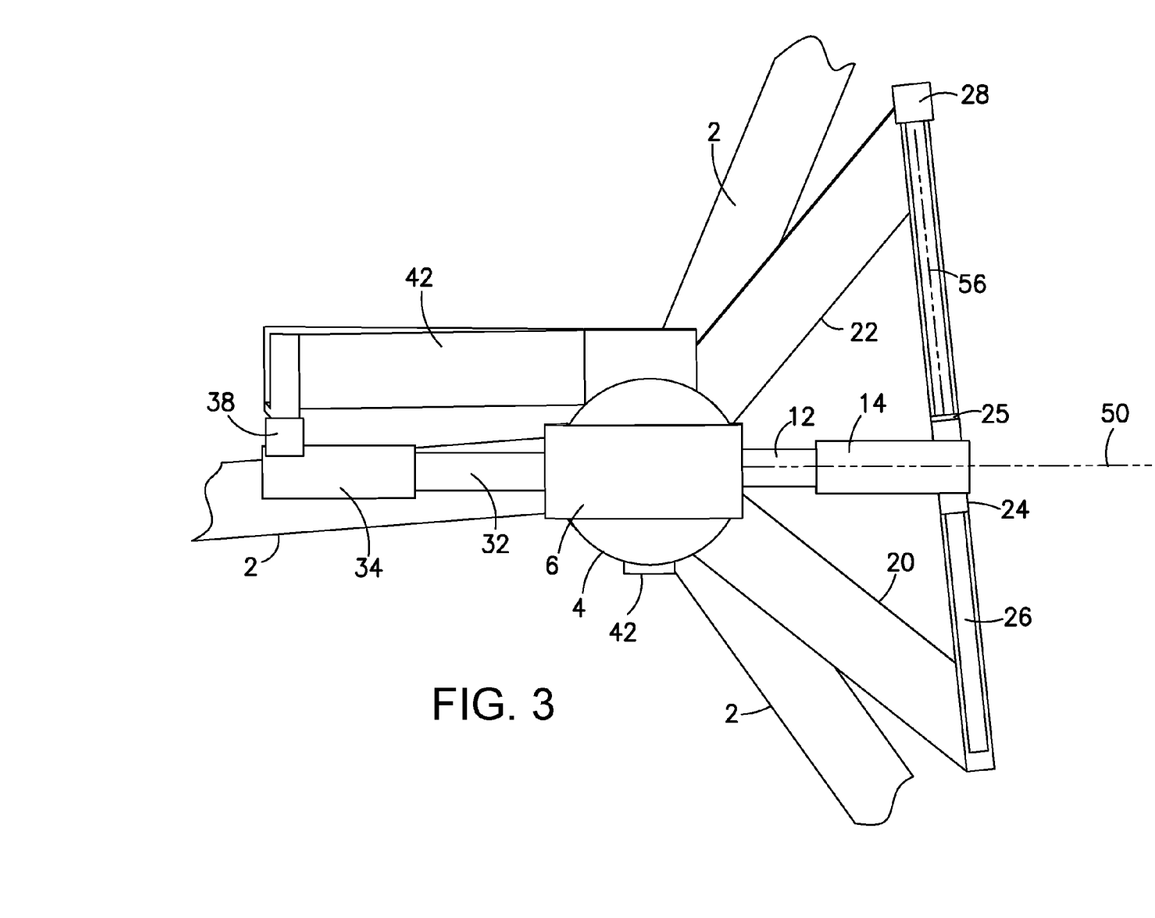
FIG. 3 is a diagram representing a top view of some of the components of the laser tracker depicted in [0020] FIG. 2.

As seen in FIGS. 2 and 3, the pan unit rotation encoder kit comprises the following: (a) a linear slide comprising a linear track 26 and a carriage 24 slidably coupled to the linear track 26 by ball bearings (not shown in FIGS. 2 and 3, but see ball bearings 96 in FIG. 11); (b) a plane mirror 25 attached to one end of the carriage 24, and (c) an optical detector head 28 attached at one end of the linear track 26 and facing the plane mirror 25. A pair of cantilever arms 20 and 22 each have one end connected to or integrally formed with base 2. The other ends of cantilever arms 20 and 22 support opposing ends of the linear track 26. The linear track 26 has a fixed position in a plane perpendicular to the axis of rotation of the pan unit 4. Assuming that the base 2 rests on a level surface, the linear track 26 may lie in a horizontal plane. In the alternative, the linear track may lie in a plane which is tilted downward relative to the horizontal plane (as will be explained in more detail below).

The plane mirror 25 is oriented perpendicular to the line of displacement of the carriage 24 (i.e., perpendicular to the centerline of linear track 26). In response to applied force, the carriage 24 can move in either direction along the linear track 26, the direction of movement depending on the direction of the applied force. The optical detector head 28 projects a laser beam 56 (indicated by a dashed line in FIGS. 2 and 3) toward the plane mirror 25. The optical detector head 28 and plane mirror 25 are components of a position encoder system which may also include a laser unit (not shown in FIG. 1) that supplies a laser beam to the optical detector head 28, as will be described later with reference to FIG. 9. In alternative embodiments, a laser may be mounted directly in the optical detector head 28. Reflectors other than plane mirrors can be employed.

The carriage 24 is coupled to the pan unit 4 by an expandable linkage comprising links 12 and 14. One end of link 12 is fixedly coupled or integrally formed with the pan unit 4. The end of the link 14 furthest away from the pan unit 4 is rotatably coupled to carriage 24. The link 12 is telescoped inside the link 14 (or vice versa) so that link 14 is slidable relative to link 12 (by means of linear bearings not shown in the drawings), while link 12 is affixed (e.g., by a fastener) to or integrally formed with the pan unit 4. Although the cross-sectional profile of links 12 and 14 is depicted as rectangular in FIG. 2, that profile may be circular, elliptical or have some other shape. Although not shown in FIGS. 2 and 3, the rotatable coupling between link 14 and carriage 24 may comprise a vertical pin attached to carriage 24 and a circular bearing installed in link 14 that provides frictionless support for the vertical pin.

Preferably the link 12 is rotatable about the axis of the pan unit 4 and in a plane that is parallel to the plane in which the linear track 26 is disposed. For example, in an embodiment wherein the linear track 26 lies in a plane perpendicular to the axis of rotation of the pan unit 4, then the link 12 should be perpendicular to the axis of rotation of the pan unit 4. In the alternative, if the linear track 26 does not lie in a plane perpendicular to the axis of rotation of the pan unit 4, then the link 12 should be tilted relative to (rather than perpendicular to) the axis of rotation of the pan unit 4. Because the carriage 24 is constrained to travel along the linear track 26 as the pan unit 4 rotates and because the position of linear track 26 relative to the axis of rotation of pan unit 4 is known, a digital process can be configured to compute the angle of pan unit rotation based upon the distance traveled by carriage 24 along linear track 26, as explained in more detail below.

As best seen in FIG. 3, the angle between the arms 20 and 22 may be 90° or greater. As pan unit 4 rotates, the link 14 of the expandable linkage will exert a force on carriage 24, causing the latter to move. As carriage 24 moves, the plane mirror 25 attached thereto reflects the projected laser beam 56 back to the optical detector head 28. In accordance with one embodiment, the optical detector head 28 comprises a laser beam steerer, double-path interferometer optics, and a photodetector for detecting the fringe pattern produced by interference. These components, being well known in the art, are not shown in the drawings. For example, the optical detector head 28 may be configured as disclosed in U.S. Pat. No. 6,597,505. One suitable optical detector head is the RLD10 0° detector head, which is commercially available from Renishaw PLC, Gloucestershire, United Kingdom.

The photodetector may be of a type that produces four simultaneous real-time outputs representing a sampling of the sinusoidal interference pattern. Following fringe detection, the signals are processed by a combination of pre-amplifiers and differential amplifiers to remove DC offsets, generating sine and cosine signals equal to the phase difference between the outgoing laser beam and incoming laser light reflected by the plane mirror. These analog signals are converted to digital quadrature output pulses. Typically, these digital quadrature pulses are sent to a master counter of a motion controller, a numerical control computer or other motion control processor (not shown in FIGS. 2 and 3) configured to interpolate the digital quadrature pulses and generate an incremental count indicative of the incremental distance traveled by the carriage 24 during rotation of the pan unit 4.

Figure 4:
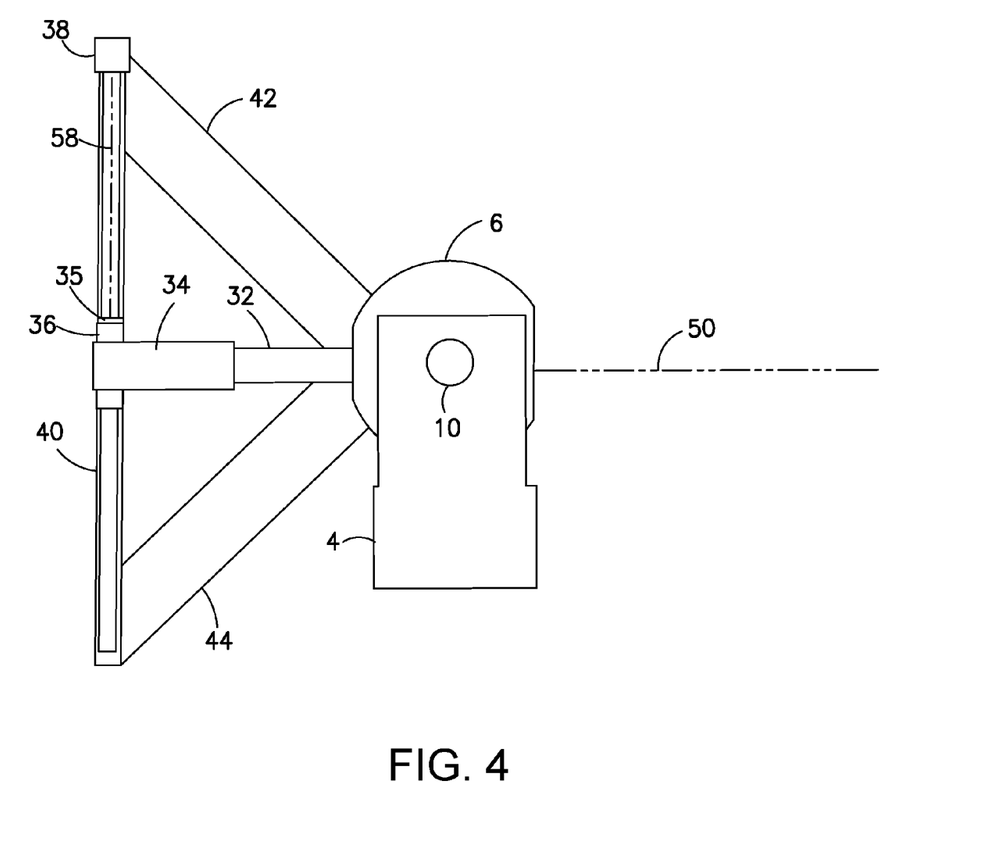
FIG. 4 is a diagram representing a side view of some of the components of the laser tracker depicted in FIG. 2.

As seen in FIGS. 2 and 4, the tilt unit rotation encoder kit in accordance with one embodiment comprises the following: (a) a linear slide comprising a linear track 40 and a carriage 36 slidably coupled to the linear track 40 by bearings (e.g., ball or air bearings or other types of low-friction bearings); (b) a plane mirror 35 attached to one end of the carriage 36, and (c) an optical detector head 38 attached at one end of the linear track 40 and facing the plane mirror 35. The optical detector head 38 may be identical in construction and operation to optical detector head 28.

Referring to FIG. 4, a pair of cantilever arms 42 and 44 each have one end connected to or integrally formed with the pan unit 4. The other ends of cantilever arms 42 and 44 support opposing ends of the linear track 40. The linear track 40 has a fixed position in a plane perpendicular to the axis of rotation of the tilt unit 6. Assuming that the base 2 rests on a level surface, the linear track 40 may lie in a vertical plane. The plane mirror 35 is oriented perpendicular to the line of displacement of the carriage 36 (i.e., perpendicular to the centerline of linear track 40). In response to applied force, the carriage 36 can move in either direction along the linear track 40, the direction of movement depending on the direction of the applied force. The optical detector head 38 projects a laser beam 58 (indicated by a dashed line in FIGS. 2 and 4) toward the plane mirror 35. The optical detector head 38 and plane mirror 35 are components of a position encoder system which may also include a laser unit (not shown in FIG. 1) that supplies a laser beam to the optical detector head 38, as will be described later with reference to FIG. 9. In alternative embodiments, respective lasers may be mounted directly in the respective optical detector heads 28 and 38.

The carriage 36 is coupled to the tilt unit 6 by an expandable linkage comprising links 32 and 34. One end of link 32 is fixedly coupled or integrally formed with the tilt unit 6. The end of the link 34 furthest away from the tilt unit 6 is rotatably coupled to the carriage 36. The link 32 is telescoped inside the link 34 (or vice versa) so that link 34 is slidable (by means of linear bearings) relative to link 32, which is fixed to tilt unit 6. Although the cross-sectional profile of links 32 and 34 is depicted as rectangular in FIG. 2, that profile may be circular, elliptical or have some other shape. Although not shown in FIGS. 2 and 4, the rotatable coupling between link 34 and carriage 36 may comprise a horizontal pin attached to the carriage 36 and a circular bearing installed in link 34 that provides frictionless support for the horizontal pin.

Because the carriage 36 is constrained to travel along the linear track 40 as the tilt unit 6 rotates and because the position of linear track 40 relative to the axis of rotation of tilt unit 6 is known, a digital process can be configured to compute the angle of tilt unit rotation based upon the distance traveled by carriage 36 along linear track 40 in the same manner previously explained with respect to computing the angle of pan unit rotation based upon distance traveled by carriage 36 along linear track 40.

As best seen in FIG. 4, the angle between the arms 42 and 44 may be 90° or greater. As tilt unit 6 rotates, the link 34 of the expandable linkage will exert a force on carriage 36, causing the latter to move. The carriage 36 is constrained to move along the linear track 40 in the manner previously described. As carriage 36 moves, the plane mirror 35 attached thereto reflects the projected laser beam 58 back to the optical detector head 38. The aforementioned motion controller or other processor (not shown in FIGS. 2-4) can be configured to generate an incremental count indicative of the incremental distance traveled by the carriage 36 during rotation of the tilt unit 6.

In accordance with an alternative embodiment depicted in FIGS. 5A and 5B, the laser interferometer-based encoders described with reference to FIGS. 2-4 can be replaced by respective linear encoders. Each linear encoder comprises a reader head that moves along a linear track and a measurement tape attached to the linear track and readable by the reader head. The respective linear encoders for encoding azimuth and zenith angular positions may be optical or magnetic. For the purpose of illustration, an embodiment employing optical linear encoders will now be described in some detail.

Figure 5A:
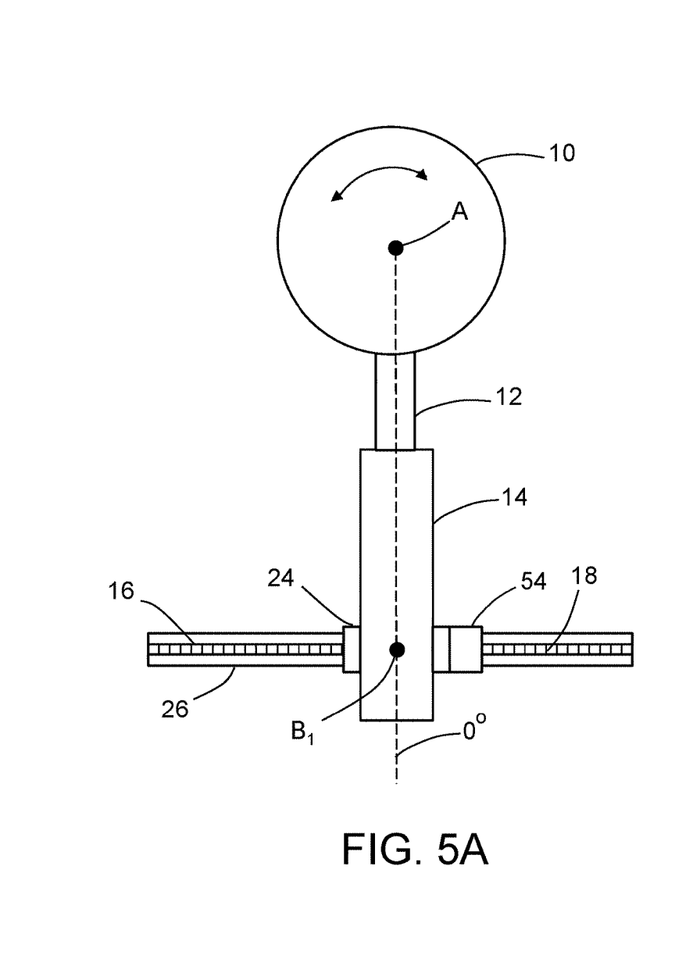
FIGS. 5A and 5B are diagrams representing respective top views of some of the components of a laser tracker having two linear encoders for encoding azimuth and zenith angular positions in accordance with another embodiment.
Figure 5B:
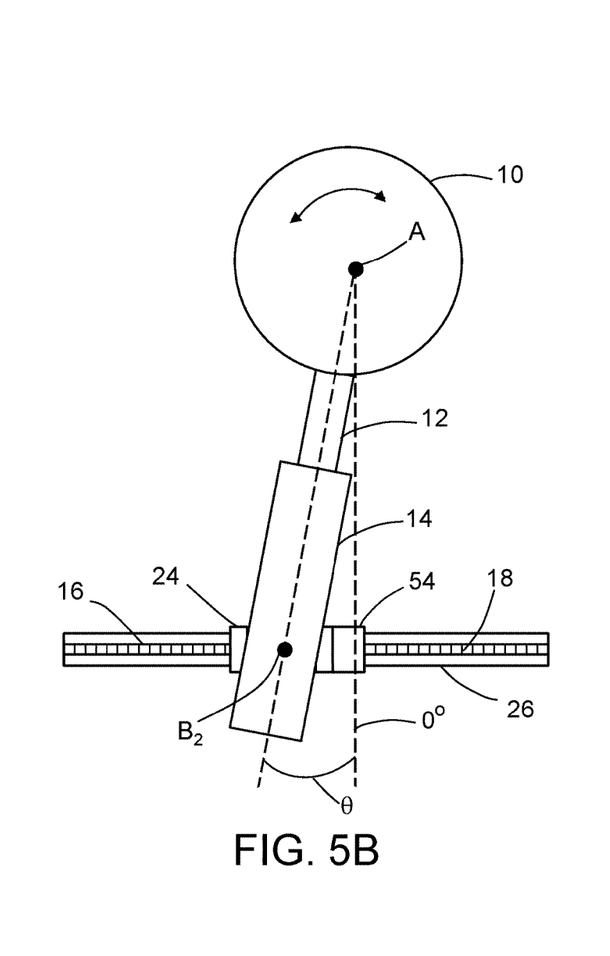

In accordance with one embodiment shown in FIGS. 5A and 5B, an alternative pan unit rotation encoder kit (which can be substituted for the pan unit encoder kit shown in FIG. 3) comprises the following: (a) a linear slide comprising a linear track 26 and a carriage 24 slidably coupled to the linear track 26 by ball bearings (not shown in FIGS. 2 and 3, but see ball bearings 96 in FIG. 11); (b) an optical reader head 54 attached to one end of the carriage 24; and (c) a measurement tape 16 affixed to the linear track 26, which measurement tape 16 comprises a series of optical reference marks 18 spaced at regular intervals along its length. The optical linear encoder for encoding zenith angular positions of the laser beam emitter (which can be substituted for the tilt unit encoder kit shown in FIG. 4) is not shown in the drawings but is constructed in the same manner as depicted in FIGS. 5A and 5B, except it measures in a vertical plane instead of a horizontal plane.

FIG. 5A shows a pan unit 4 in a first angular position (i.e., the azimuth angle is 0°) and the corresponding position of optical reader head 54, while FIG. 5B shows the pan unit 4 in a second angular position after the pan unit 4 has rotated about the azimuth axis by an angle θ and the corresponding position of optical reader head 54. The axis of rotation of the pan unit 4 is indicated by a black dot A in FIGS. 5A and 5B. The carriage 24 is coupled to the pan unit 4 by an expandable linkage comprising links 12 and 14. This expandable linkage may have the same construction as described previously with reference to FIG. 3, i.e., one end of the link 14 is rotatably coupled to the carriage 24. The respective locations of the axis of rotation of the link 14 are indicated by a black dot $B_1$ in FIG. 5A and by a black dot $B_2$ in FIG. 5B.

Because the carriage 24 (and the optical reader head 54 attached thereto) is constrained to travel along the linear track 26 as the pan unit 4 rotates and because the position of linear track 26 relative to the axis of rotation A of pan unit 4 is known, a digital process can be configured to compute the angle θ of pan unit rotation based upon the distance traveled by optical reader head 54 along linear track 26, as explained in more detail below.

In accordance with one embodiment, the optical reader encoder 54 is of a well-known incremental type. Such an optical reader head 54 comprises a light source (e.g., an LED) and a photodetector array that detects any reference marks 18 in its field of view at any instant in time. Incremental optical linear encoders typically output two quadrature signals (90 degrees out of phase) which are decoded to produce a count up pulse or a count down pulse. For decoding in software, the two quadrature signals are read by software, either via an interrupt on any edge or polling, and a state diagram lookup table is used to decode the direction of movement of the reader head.

In accordance with alternative embodiments, magnetic linear encoders can be substituted for the optical linear encoders. Such magnetic linear encoders may be of a well-known incremental type. Such magnetic linear encoders comprise a differential magnetoresistive sensor which detects a magnetic signature of a magnetized scale, producing sine and cosine signals as it moves along the scale. These analog signals can then be interpolated internally to produce a range of resolutions to 1 μm or smaller.

Referring again to FIGS. 5A and 5B, because the optical reader head 54 and the axis of rotation of link 14 are attached to the carriage 24, the optical reader head 54, axis of rotation of link 14 and carriage 24 will displace in unison along the length of the linear track 26 during rotation of the pan unit 4. The distance traveled is a known function of the angle of rotation of the pan unit 4.

Figure 6:
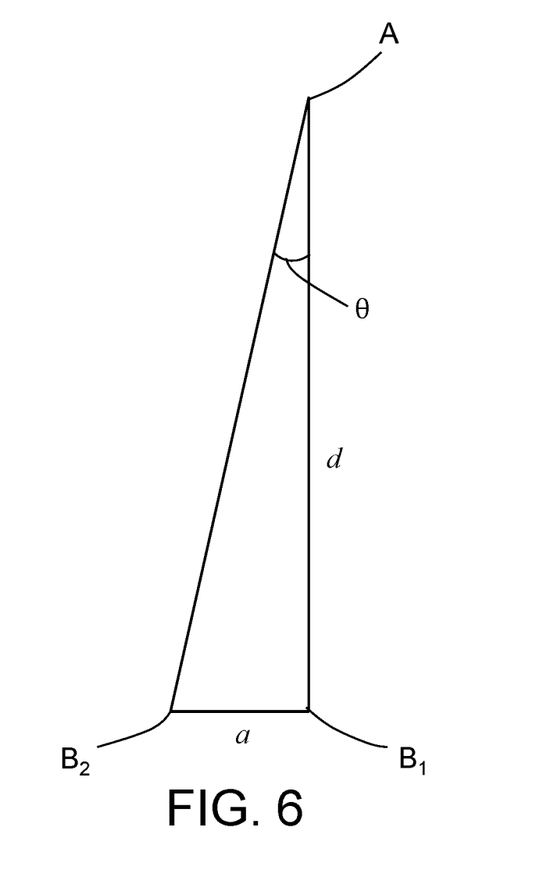
FIG. 6 is a diagram showing the geometric relationship between the angle θ seen in FIG. 5B and the distance a traveled by the reader head during rotation of the pan unit through the angle θ, where d is the distance from the axis of rotation A of the pan unit to a location B1 where an axis of rotation of the reader head is located when the angular position of the pan unit is 0°.

FIG. 6 is a diagram showing the geometric relationship between the angle of rotation θ seen in FIG. 5B and the distance a traveled by the optical reader head 54 during that rotation, where d is the known minimum distance from the axis of rotation A of the pan unit 4 to the location B1 of the axis of rotation of link 14 (see FIG. 5B) when link 14 is perpendicular to the linear track 26. For the purpose of this example, the angular position of the pan unit 4 is assumed to be 0° when link 14 is perpendicular to the linear track 26. More specifically, the distance a is the distance traveled by the axis of rotation of link 14 as it moves from location $B_1$ to location $B_2$ during rotation of pan unit 4 from 0 to θ degrees. The rotation angle θ can be computed from the measured distance a using the following equation:

$$\theta = \tan^{-1}(a/d)$$

Thus by detecting the distance a with high accuracy, the angle θ can be computed with high accuracy.

Figure 7:
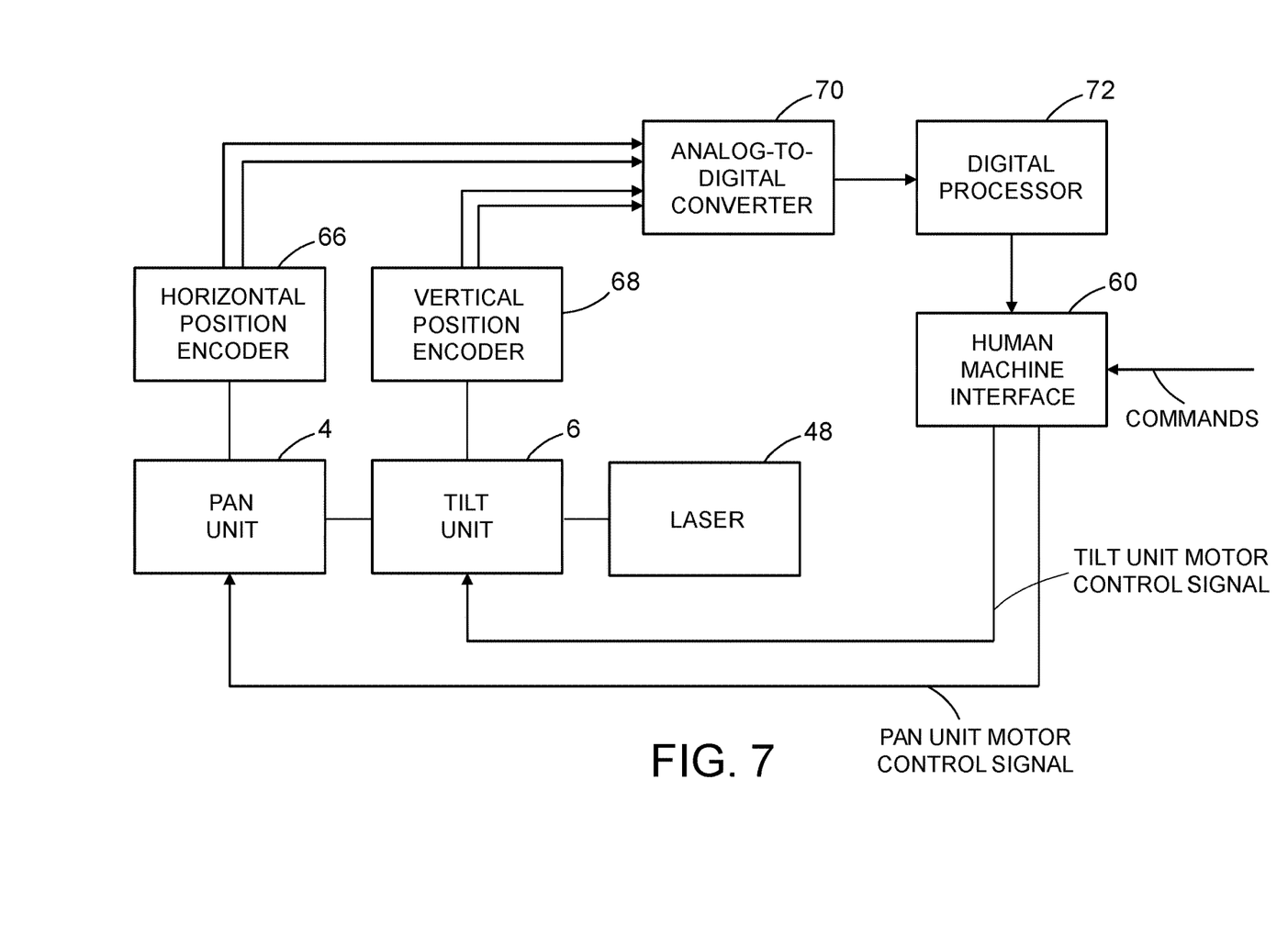
FIG. 7 is a block diagram identifying components of a system for measuring angular position of a laser beam emitter using distance measurements acquired by position encoders that travel along linear tracks during rotations of the laser beam emitter about the azimuth and zenith axes.

FIG. 7 is a block diagram identifying components of a system for measuring angular position of a laser beam emitter using distance measurements acquired by position encoders that travel along linear tracks. The system components include a pan unit 4 which is rotatably coupled to a base (not shown in FIG. 7), a tilt unit 6 which is rotatably coupled to the pan unit 4, and a laser 48 housed within the tilt unit 6. The pan unit 4 is rotatable about an azimuth axis; the tilt unit is rotatable about a zenith axis which is perpendicular to the azimuth axis. The laser 48 produces a laser beam which passes through (i.e., is emitted from) an optically transparent aperture (not shown in FIG. 7) incorporated in the tilt unit 6. Thus tilt unit 6 and laser 48 form a laser beam emitter having azimuth and zenith angles in the frame of reference of the laser tracker.

Each of the pan and tilt units 4 and 6 comprises a respective motor (not shown in FIG. 7) for driving rotation of those units in response to the receipt of motor control signals from a human machine interface 60. In addition or in the alternative, motor control signals may be provided directly by a digital processor 72.

The system depicted in FIG. 7 further comprises a horizontal position encoder 66 and a vertical position encoder 68 of one of the types described above (i.e., laser interferometer-based encoders or linear encoders). The horizontal position encoder 66 is coupled to the pan unit 4 for encoding an azimuth angular position of the pan unit 4. The vertical position encoder 68 is coupled to the tilt unit 6 for encoding the zenith angular position of the tilt unit 6. The analog outputs of the horizontal and vertical position encoders 66 and 68 (representing incremental linear displacements) are sent to an analog-to-digital converter 70. The digital outputs (representing incremental linear displacements) from the analog-to-digital converter 70 are interpolated and converted into incremental counts by the digital processor 72. The digital processor 72 is configured to compute the current angular position (i.e., azimuth and zenith angles) of the laser beam emitter (i.e., tilt unit 6 and laser 48) based on known starting angular positions and the incremental counts, which represent incremental linear displacements. This angular position data can be sent to the human machine interface 60 for display on a display screen (not shown). The digital processor 72 may also output pan or tilt unit motor control signals, which can be sent to the pan and tilt unit motors via the human machine interface 60 or directly. When a desired angular position is reached, the motor causing that rotation will be stopped.

Figure 8:
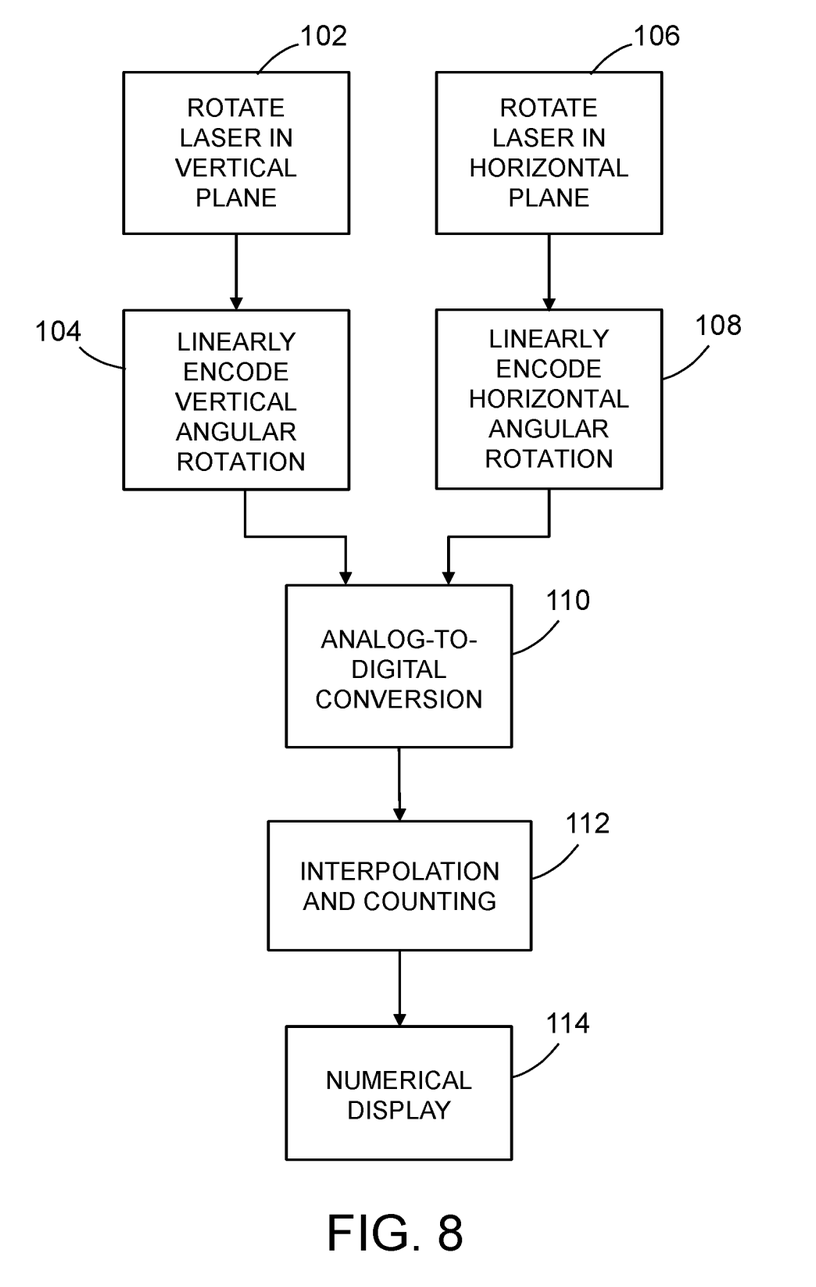
FIG. 8 is a flowchart identifying steps of a method for displaying the angular position of a laser beam emitter measured using position encoders that travel along linear tracks.

FIG. 8 is a flowchart identifying steps of a method for displaying the angular position of a laser beam emitter measured using position encoders that travel along linear tracks. The laser beam emitter (i.e., tilt unit and laser) is rotated in a vertical plane (step 102), which rotation is linearly encoded using a position encoder that travels along a vertical linear track and outputs analog signals (step 104). Also, the laser beam emitter is rotated in a horizontal plane (step 106), which rotation is linearly encoded using a position encoder that travels along a horizontal linear track and outputs analog signals (step 108). Steps 102 and 106 can be performed concurrently or in sequence. The analog signals produced in steps 104 and 108 are converted to digital signals (step 110). The digital signals are then interpolated and counted by a digital processor to produce incremental counts representing incremental angular rotations about the azimuth and zenith axes (step 112). The digital processor is configured to generate azimuth and zenith angles representing the angular position of the laser beam emitter for numerical display (step 114).

Figure 9:
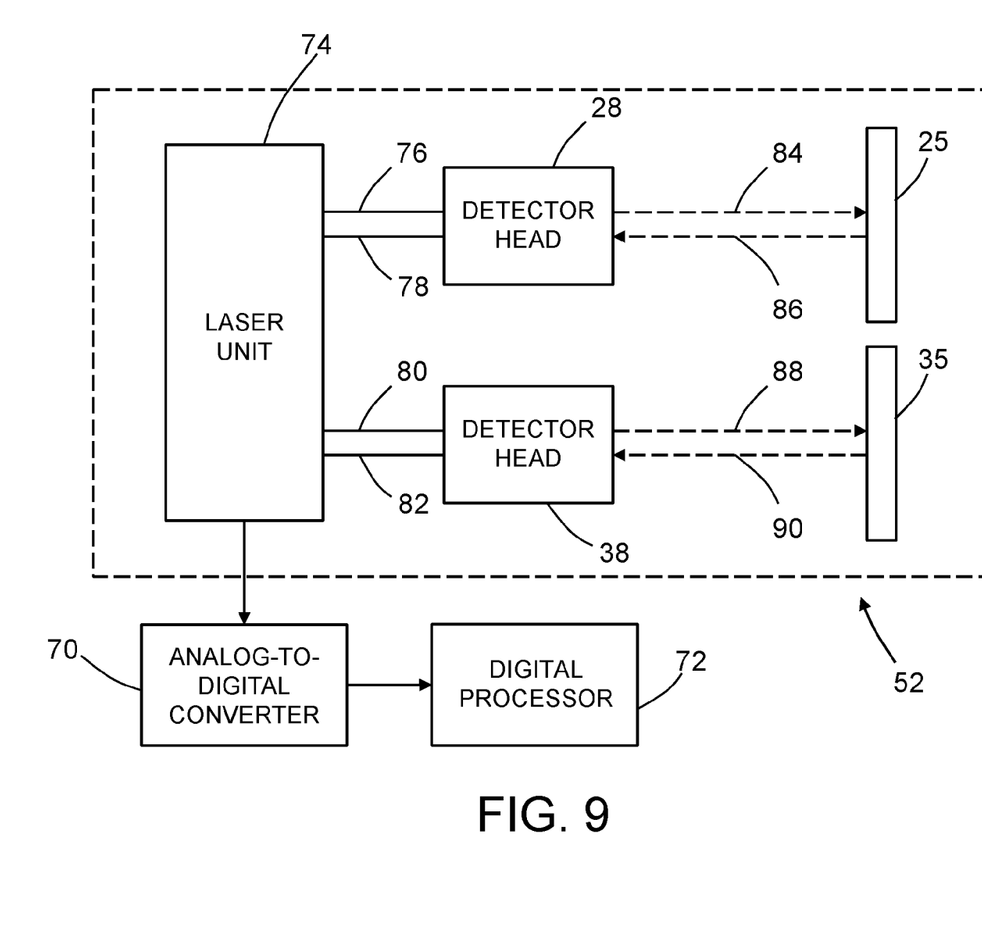
FIG. 9 is a block diagram identifying components of a system for measuring angular position of a laser beam emitter using distance measurements acquired by a laser interferometer-based encoder system in accordance with one embodiment.

FIG. 9 is a block diagram identifying components of a system for measuring angular position of a laser beam emitter using distance measurements acquired by a laser interferometer-based encoder system 52. The laser interferometer-based encoder system 52 comprises a laser unit 74 which is connected to an optical detector head 28 by an electrical cable 76 and a fiber optic cable 78 and to an optical detector head 38 by an electrical cable 80 and a fiber optic cable 82. The laser unit 74 uses the optical fiber inside the fiber optic cables 78 and 82 to deliver respective laser beams to the optical detector heads 28 and 38. The optical detector heads 28 and 38 project the respective laser beams 84 and 88 toward respective plane mirrors 25 and 35, as previously described with reference to FIGS. 2-4. Each of the optical detector heads 28 and 38 may comprise a respective beam steerer that can be adjusted to align the projected laser beams 84 and 88 with the respective axes of motion of the plane mirrors 25 and 35. The plane mirrors 25 and 35 respectively reflect impinging laser light 86 and 90 back to the optical detector heads 28 and 38. In accordance with one embodiment, the laser unit 74 comprises a HeNe laser tube, optical elements for coupling laser light from the HeNe laser tube to the optical fibers of the fiber optic cables 78 and 82, and system electronics (e.g., signal processors) which output sinusoidal analog signals to the analog-to-digital converter 70 for subsequent processing by the digital processor 72.

Figure 10:
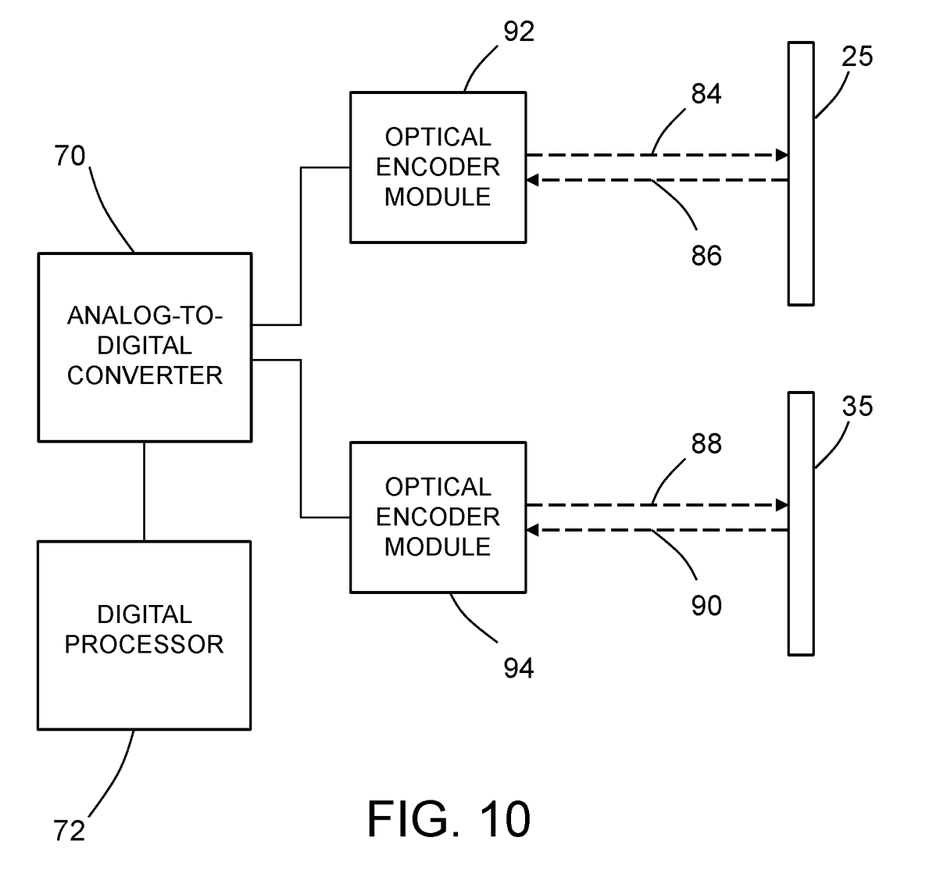
FIG. 10 is a block diagram identifying components of a system for measuring angular position of a laser beam emitter using distance measurements acquired by a laser interferometer-based encoder system in accordance with an alternative embodiment.

FIG. 10 identifies components of a system for measuring angular position of a laser beam emitter in accordance with an alternative embodiment. Instead of a separate standalone laser unit supplying respective laser beams to respective optical detector heads, respective lasers can be installed inside the same housing with the respective optical detector to form a respective optical encoder module. In the embodiment depicted in FIG. 1, the optical encoder modules 92 and 94 project the respective laser beams 84 and 88 toward respective plane mirrors 25 and 35, as previously described with reference to FIGS. 2-4. Each of the optical encoder modules 92 and 94 may comprise the components of an optical detector previously described, including a respective beam steerer that can be adjusted to align the projected laser beams 84 and 88 with the respective axes of motion of the plane mirrors 25 and 35. The plane mirrors 25 and 35 respectively reflect impinging laser light 86 and 90 back to the photodetectors inside the optical encoder modules 92 and 94. In accordance with this embodiment, the optical encoder modules 92 and 94 also comprise respective signal processors which receive the electrical signals from the photodetector and output sinusoidal analog signals to the analog-to-digital converter 70 for subsequent processing by the digital processor 72.

Figure 11:
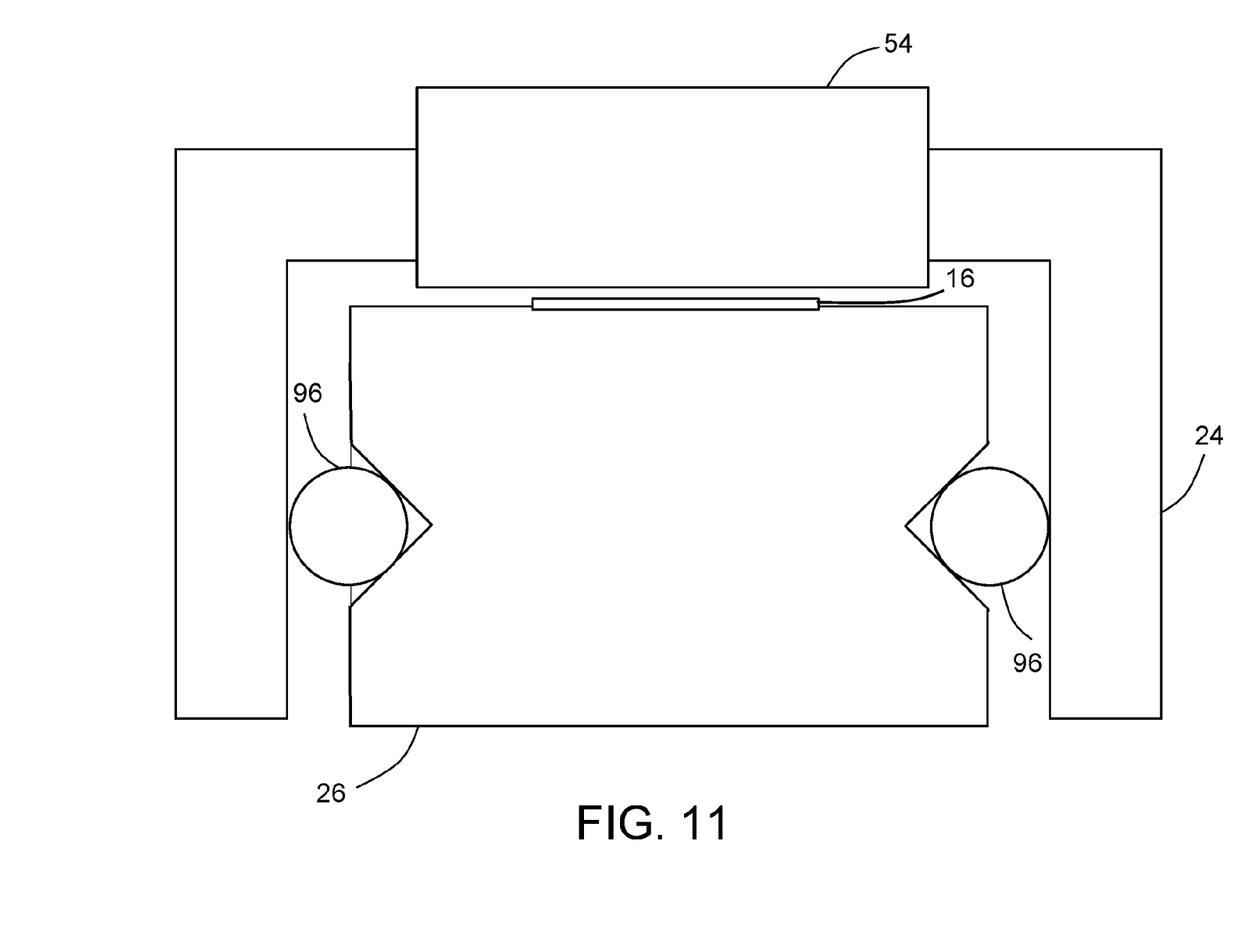
FIG. 11 is a diagram representing a cross-sectional view of an optical linear encoder in accordance with one embodiment, the section plane being perpendicular to a linear track of the linear encoder.

FIG. 11 is a diagram representing a cross-sectional view of an optical linear encoder in accordance with one embodiment, the section plane being perpendicular to a linear track 26 of the optical linear encoder. A carriage 24 is slidably coupled to the linear track 26 (with very tight tolerance) by rows of ball bearings 96 disposed in respective channels on opposite sides of the linear track 26. A measurement tape 16 with optical reference marks is affixed to a top surface of the linear track 26. An optical reader head 54 is mounted to one end of the carriage 24. As the carriage 24 moves along the linear track 26, the optical reader head 54 transmits light toward and receives returned light from the stationary measurement tape 16.

In accordance with alternative embodiments, a magnetic reader head and a magnetic measurement tape can be respectively substituted for the optical reader head 54 and optical measurement tape 16 depicted in FIG. 10. The magnetic tape may be placed in a recess formed in the top of the linear track 26.

While apparatus and methods have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The method claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude any portions of two or more steps being performed concurrently or alternatingly.

The invention claimed is:

1. A system for measuring angular position of a laser beam emitter, comprising:
    a base;
    a pan unit rotatably coupled to the base and rotatable about a first axis;
    a tilt unit rotatably coupled to the pan unit, rotatable about a second axis perpendicular to the first axis, and comprising an optically transparent aperture;
    a laser mounted inside the tilt unit such that a laser beam produced by the laser passes through the aperture;
    a first linear track having a first fixed position;
    a first position encoder comprising a first component displaceably coupled to the first linear track and a second component having a fixed position relative to the first linear track; and
    a first expandable linkage comprising a first link fixedly coupled to or integrally formed with the pan unit and a second link rotatably coupled to the first component of the first position encoder.

2. The system as recited in claim 1, wherein the second link is slidably coupled to the first link.

3. The system as recited in claim 1, wherein the first component of the first position encoder comprises a reader head and the second component of the first position encoder comprises a series of reference marks spaced at regular intervals along a length of the first linear track.

4. The system as recited in claim 1, wherein the first position encoder comprises a laser interferometer-based encoder.

5. The system as recited in claim 4, wherein the first component of the laser interferometer-based encoder comprises a reflector and the second component of the laser interferometer-based encoder comprises an optical detector head.

6. The system as recited in claim 5, wherein the optical detector head comprises an interferometer and a photodetector.

7. The system as recited in claim 6, wherein the laser interferometer-based encoder further comprises a laser unit fiber optically coupled to the interferometer and not coupled to the first linear track.

8. The system as recited in claim 4, wherein the laser interferometer-based encoder further comprises a laser, an interferometer and a photodetector.

9. The system as recited in claim 1, wherein the first position encoder comprises an electrical output, the system further comprising:
    an analog-to-digital converter electrically coupled to the electrical output of the first position encoder; and
    a digital processor configured to calculate an azimuth angle of the laser beam emitter based upon electrical outputs from the analog-to-digital converter.

10. The system as recited in claim 1, further comprising:
    a second linear track having a second fixed position;
    a second position encoder comprising a first component displaceably coupled to the second linear track and a second component having a fixed position relative to the second linear track; and
    a second expandable linkage comprising a first link fixedly coupled to or integrally formed with the tilt unit and a second link rotatably coupled to the first component of the second position encoder.

11. The system as recited in claim 10, wherein the first components of the first and second position encoders comprise respective reader heads, and the second components of the first and second position encoders comprise respective series of reference marks spaced at regular intervals along respective lengths of the first and second linear tracks.

12. The system as recited in claim 10, wherein the first components of the first and second position encoders comprise respective reflectors, and the second components of the first and second position encoders comprise respective optical detector heads.

13. The system as recited in claim 12, wherein each optical detector head comprises an interferometer and a photodetector.

14. The system as recited in claim 13, further comprising a laser unit fiber optically coupled to the optical detector heads.

15. The system as recited in claim 10, wherein each of the first components of the first and second position encoders comprises a respective electrical output, the system further comprising:
- an analog-to-digital converter electrically coupled to the electrical outputs of the first components of the first and second position encoders; and
- a digital processor configured to calculate azimuth and zenith angles of the laser beam emitter based upon electrical outputs from the analog-to-digital converter.

16. A system for measuring angular position of a laser beam emitter, comprising:
- a base;
- a pan unit rotatably coupled to the base and rotatable about a first axis;
- a tilt unit rotatably coupled to the pan unit, rotatable about a second axis perpendicular to the first axis, and comprising an optically transparent aperture;
- a laser mounted inside the tilt unit such that a laser beam produced by the laser passes through the aperture;
- a linear track having a fixed position;
- a position encoder comprising a first component displaceably coupled to the linear track and a second component having a fixed position relative to the linear track; and
- an expandable linkage comprising a first link fixedly coupled to or integrally formed with the tilt unit and a second link rotatably coupled to the first component of the position encoder.

17. The system as recited in claim 16, wherein the first component of the position encoder comprises a reader head, and the second component of the position encoder comprises a series of reference marks spaced at regular intervals along a length of the linear track.

18. The system as recited in claim 16, wherein the first component of the position encoder comprises a reflector, and the second component of the position encoder comprises an optical detector head.

19. A method for operating a laser beam emitter rotatably coupled to a rotatable pan unit, comprising:
- (a) coupling a component of a first position encoder to the pan unit by way of a first expandable linkage that expands as the distance traveled by the component of the first position encoder along a first linear track increases;
- (b) rotating the pan unit about a first axis;
- (c) measuring a distance traveled by the component of the first position encoder along the first linear track during rotation of the pan unit about the first axis;
- (d) computing an azimuth angle of the laser beam emitter based upon the distance measured in step (c); and
- (e) stopping rotation of the pan unit when a desired azimuth angle is reached.

20. The method as recited in claim 19, wherein the laser beam emitter is rotatably coupled to the rotatable pan unit by a rotatable tilt unit, further comprising:
- (f) coupling a component of a second position encoder to the tilt unit by way of a second expandable linkage that expands as the distance traveled by the component of the second position encoder along a second linear track increases;
- (g) rotating the tilt unit about a second axis perpendicular to the first axis;
- (h) measuring a distance traveled by the component of the second position encoder along the second linear track during rotation of the tilt unit about the second axis;
- (i) computing a zenith angle of the laser beam emitter based upon the distance measured in step (h); and
- (j) stopping rotation of the tilt unit when a desired zenith angle is reached.

\* \* \* \* \*